(12) United States Patent
Weires et al.

(10) Patent No.: US 9,790,583 B2
(45) Date of Patent: Oct. 17, 2017

(54) HIGH TEMPERATURE NITRIDING OF TITANIUM PARTS

(71) Applicant: The Boeing Company, Chicago, IL (US)

(72) Inventors: Dale J. Weires, Hockessin, DE (US); Scott M. Holder, Cherry Hill, NJ (US); Julia H. Grogan, Philadelphia, PA (US)

(73) Assignee: THE BOEING COMPANY, Chicago, IL (US)

( * ) Notice: Subject to any disclaimer, the term of this patent is extended or adjusted under 35 U.S.C. 154(b) by 704 days.

(21) Appl. No.: 13/936,207

(22) Filed: Jul. 8, 2013

(65) Prior Publication Data
US 2013/0292007 A1 Nov. 7, 2013

Related U.S. Application Data

(62) Division of application No. 12/839,647, filed on Jul. 20, 2010, now Pat. No. 8,496,872.

(51) Int. Cl.
| | |
|---|---|
| *C23C 8/24* | (2006.01) |
| *C21D 1/42* | (2006.01) |
| *C21D 9/32* | (2006.01) |
| *C23C 8/06* | (2006.01) |
| *C21D 1/10* | (2006.01) |
| *C21D 1/667* | (2006.01) |
| *C22F 1/16* | (2006.01) |

(52) U.S. Cl.
CPC .................. *C23C 8/24* (2013.01); *C21D 1/10* (2013.01); *C21D 1/667* (2013.01); *C21D 9/32* (2013.01); *C22F 1/16* (2013.01); *C23C 8/06* (2013.01); *Y02P 10/253* (2015.11)

(58) Field of Classification Search
CPC .................................. C21D 1/42; C23C 8/24
USPC ......... 148/224, 525, 526, 565–567, 573–575
See application file for complete search history.

(56) References Cited

U.S. PATENT DOCUMENTS

| | | |
|---|---|---|
| 1,939,712 A | 12/1933 | Mahoux |
| 2,444,259 A * | 6/1948 | Jordan ..................... C21D 9/32 148/573 |
| 4,251,704 A | 2/1981 | Masie et al. |
| 4,448,633 A | 5/1984 | Shuskus |
| 4,675,488 A | 6/1987 | Mucha et al. |

(Continued)

OTHER PUBLICATIONS

Grdina et al. "Surface Hardening of Titanium by Nitrogen and Carbon Using High-Frequency Induction Heating." Diffusion Cladding of Metals. 1967. pp. 69-72.*

(Continued)

*Primary Examiner* — Brian Walck
(74) *Attorney, Agent, or Firm* — Yee & Associates, P.C.

(57) ABSTRACT

A method and apparatus for manufacturing a part. The part may be positioned in a chamber. The part may be comprised of a metal and may be a positioned part. A gas containing nitrogen may be sent into the chamber. An electromagnetic field may be generated in the chamber with the gas. The electromagnetic field may heat a portion of the metal in the positioned part to a temperature from about 60 percent to about 99 percent of the melting point of the metal such that the portion of the metal has a desired hardness. The portion of the metal may extend from a surface of the positioned part to a selected depth from the surface.

13 Claims, 5 Drawing Sheets

(56) References Cited

U.S. PATENT DOCUMENTS

| | | | |
|---|---|---|---|
| 4,757,170 | A | 7/1988 | Mucha et al. |
| 4,894,501 | A | 1/1990 | Pfaffmann et al. |
| 4,902,359 | A | 2/1990 | Takeuchi et al. |
| 5,221,513 | A | 6/1993 | Amateau et al. |
| 5,331,127 | A | 7/1994 | Chen |
| 5,391,862 | A | 2/1995 | Amateau et al. |
| 5,447,580 | A | 9/1995 | Semiatin et al. |
| 5,451,275 | A | 9/1995 | Amateau et al. |
| 5,466,305 | A | 11/1995 | Sato et al. |
| 5,527,020 | A | 6/1996 | Ganesh et al. |
| 5,656,106 | A | 8/1997 | Amateau et al. |
| 5,767,628 | A | 6/1998 | Keller et al. |
| 5,799,398 | A | 9/1998 | Amateau et al. |
| 6,007,762 | A | 12/1999 | Amateau et al. |
| 6,059,898 | A | 5/2000 | Fisher et al. |
| 6,126,892 | A | 10/2000 | Amateau et al. |
| 6,289,033 | B1 | 9/2001 | Tipton et al. |
| 6,576,877 | B2 | 6/2003 | Dabelstein et al. |
| 7,161,124 | B2 | 1/2007 | Kisner et al. |
| 7,641,850 | B2 | 1/2010 | Sontti et al. |
| 2004/0219051 | A1 | 11/2004 | Sontti et al. |
| 2006/0231549 | A1 | 10/2006 | Kisner et al. |
| 2010/0200123 | A1 | 8/2010 | Kirkwood et al. |
| 2016/0068922 | A1 | 3/2016 | Kirkwood et al. |

OTHER PUBLICATIONS

ASM International, Materials Park, Ohio, Heat Treating, "Gas Nitriding," vol. 4, pp. 387-409, Aug. 1991.
Final Office Action, dated Feb. 12, 2015, regarding U.S. Appl. No. 12/369,157, 23 pages.
Weires et al., "High Temperature Nitriding of Titanium Parts," U.S. Appl. No. 12/839,647, filed Jul. 20, 2010, 37 pages.
Bars et al., "Titanium a-Nitrogen Solid Solution Formed by high Temperature Nitriding: Diffusion of Nitrogen, Hardness, and Crystallographic Parameters", Metalurgical Transactions A, vol. 14A, Aug. 1983, pp. 1537-1543.
European Patent Office Search Report, dated Mar. 26, 2010, regarding Application No. EP10153270.3, 7 pages.
"Finishing Methods", ASM Handbook, ASM International, published 1994, accessed Jul. 22, 2011, 4 pages http://products.asminternational.org/hbk/do/highlight/content/MH/D33/A03/S0080555.html.
Leis et al., "Effect of Surface Conditions and Processing on Fatigue Performance", ASM Handbook, ASM International, published 1996, accessed Jul. 22, 2011, 4 pages.
Magnan et al., "The Nitriding Behavior of Ti-Al Alloys at 1000C," Metallurgical and Materials Transactions A, vol. 30A, Jan. 1999, pp. 19-29.
Malinov et al., "Modelling the Nitriding in Titanium Alloys", School of Mechanical and Aerospace Engineering Collection, The Queen's University of Belfast, Jun. 2010, 9 pages.
Malinov et al., "Relation Between the Microstructure and Properties of Commercial Titanium Alloys and the Parameters of Gas Nitriding," Metal Science and Heat Treatment, vol. 46, Nos. 7-8, Jul. 2004, pp. 286-293. (Translated from Metallovedenie i Termicheskaya Obrabotka Metallov, No. 7, pp. 21-28, Jul. 2004).
Mishra et al., "Surface nitriding of titanium in arc plasma", Journal of Materials Processing Technology, vol. 132, Nos. 1-3, Jan. 2003, pp. 143-148.
Nishikiori et al., "Application of heat-resistant titanium-based compressor disk with dual structure", Materials Science and Engineering A, vol. 213, Aug. 1996, pp. 124-127.
Nolan et al., "Sliding wear of titanium nitride thin films deposited on Ti-6A!-4V alloy by PVD and plasma nitriding processes," Surface & Coatings Technology, vol. 200, Nos. 20-21, May 2006, pp. 5698-5705.
Novikova et al., "Nitriding of the VT14 Alloy for Gears," Metal Science and Heat Treatment, vol. 7, No. 10, Oct. 1965, pp. 639-642. (Translated from Metallovedenie i Termicheskaya Obrabotka Metallovm No. 10, pp. 19-22, Oct. 1965).
Pogrelyuk, "On the Problem of Intensification of Nitriding of Titanium Alloys," Metal Science and Heat Treatment, vol. 41, No. 6, Jun. 1999, pp. 242-245.
Rajasekaran et al., "Plain fatigue and fretting fatigue behavior of plasma nitrided Ti-6Al-4V", Materials Letters, vol. 62, No. 16, Jun. 2008, pp. 2473-2475.
Rolinski, "Mechanism of High-temperature plasma Nitriding of Titanium," Materials Science and Engineering, vol. 100, Apr. 1988, pp. 193-199.
Sha et al., "Gas Nitriding of High Strength Titanium Alloy B21s and Its Microstructure," Microscopy and Analysis, Jan. 2009, pp. 5-8.
Zhecheva et al., "Enhancing the microstructure and properties of titanium alloys through nitriding and other surface engineering methods," Surface & Coatings Technology, vol. 200, No. 7, Dec. 2005, pp. 2192-2207.
Zhecheva et al., "Studying and Modeling Surface Gas Nitriding for Titanium Alloys", JOM, vol. 59, No. 6, Jun. 2007, pp. 38-40.
Zhecheva et al., "Titanium alloys after surface gas nitriding," Surface & Coatings Technology, vol. 201, No. 6, Dec. 2006, pp. 2467-2474.
Office Action, dated Aug. 4, 2011, regarding U.S. Appl. No. 12/369,157, 28 pages.
Final Office Action, dated Jan. 17, 2012, regarding U.S. Appl. No. 12/369,157, 22 pages.
Office Action, dated Oct. 17, 2012, regarding U.S. Appl. No. 12/839,647, 27 pages.
Final Office Action, dated Feb. 4, 2013, regarding U.S. Appl. No. 12/839,647, 12 pages.
Notice of Allowance, dated Mar. 26, 2013, regarding U.S. Appl. No. 12/839,647, 10 pages.
Notice of Allowance, dated Jul. 10, 2015, regarding U.S. Appl. No. 12/369,157, 7 pages.
Santhanakrishnan et al., "Laser Surface Hardening, Steel Heat Treating Fundamentals and Processes," ASM International, Materials Park, Ohio, Heat Treating, vol. 4A, 1 page, 2013.
Office Action, dated Jul. 25, 2014, regarding U.S. Appl. No. 12/369,157, 29 pages.

* cited by examiner

| | TEMPERATURE | TIME | SURFACE HARDNESS (H15N) | HARDNESS (ROCKWELL HRc SCALE) | EFFECTIVE CASE DEPTH (INCHES) |
|---|---|---|---|---|---|
| TEST 1 (D08) | 1350°c | 5 MINUTES | 88 | 55 | 0.013 |
| TEST 2 (D34) | 1400°c | 170 SECONDS | 88 | 55 | 0.012 |
| TEST 3 (D20) | 1450°c | 10 MINUTES | 88 | 55 | 0.020 |
| TEST 4 (D25) | 1525°c | 2 MINUTES | 90 | 60 | 0.018 |

HIGH TEMPERATURE NITRIDING OF TITANIUM PARTS

This application is a divisional of application Ser. No. 12/839,647, filed Jul. 20, 2010, status pending.

BACKGROUND INFORMATION

1. Field

The present disclosure relates generally to manufacturing parts and, in particular, to a method and apparatus for manufacturing hardened metallic structures. Still more particularly, the present disclosure relates to a method and apparatus for manufacturing a titanium part having a desired case thickness.

2. Background

A structure formed using titanium parts may have a reduced weight as compared to a structure formed using parts comprised of other types of metals or metal alloys. For example, without limitation, titanium parts may provide an increased strength to weight advantage over steel. However, titanium parts may not have the surface hardness desired for applications that involve the rubbing of two titanium surfaces against each other. For example, without limitation, titanium surfaces may be prone to undesired effects, such as galling, scoring, and/or fretting.

These undesired effects may be prevented using a number of different methods including, without limitation, nitriding. With nitriding, nitrogen may be introduced into a portion of the titanium part through, for example, without limitation, diffusion. This introduction of nitrogen into the titanium part may produce a layer on the surface of the titanium part comprising, without limitation, titanium nitrides. This layer may be referred to as a case for the titanium part.

Currently available processes for nitriding titanium may form cases that have a depth of about 0.005 inches or less. However, with cases of these depths, the titanium parts may not be capable of carrying larger applied loads. In other words, these case depths may be too thin to allow the titanium parts to carry larger applied loads.

For example, without limitation, titanium parts may take the form of gears, bearings, shafts, rods, and/or other suitable types of parts. Applications using these parts, such as, for example, without limitation, gear or bearing applications, may result in applied loads to titanium parts that may produce surface and sub-surface stresses in the titanium part. Currently available processes of nitriding may not provide a case depth that is deep enough to prevent these undesired stresses in the case. Additionally, currently available processes of nitriding may not be able to form cases of a sufficient depth for counteracting surface contact stresses, bending stresses, sub-surface shear stresses, and/or other undesired effects.

Therefore, it would be advantageous to have a method and apparatus that takes into account one or more of the issues discussed above, as well as possibly other issues.

SUMMARY

In one advantageous embodiment, a method may be provided for manufacturing a part. The part may be positioned in a chamber. The part may be comprised of a metal. A gas containing nitrogen may be sent into the chamber. An electromagnetic field may be generated in the chamber with the gas. The electromagnetic field may heat a portion of the metal in the positioned part to a temperature from about 60 percent to about 99 percent of a melting point of the metal. The portion of the metal may extend from a surface of the positioned part to a selected depth from the surface.

In another advantageous embodiment, a method may be provided for forming a case on a titanium part. The titanium aircraft part may be positioned in a chamber. The titanium part may be comprised of a metal and may be a positioned part. The metal may be selected from a group comprising titanium and a titanium alloy. The titanium part may be selected from a group comprising a gear, a bearing, a crankshaft, a camshaft, a cam follower, a valve, an extruder screw, a die, a bushing, a pin, and an injector. A vacuum may be applied in the chamber. After removing all air from the chamber, a gas containing nitrogen may be sent into the chamber to generate a pressure of up to about 150 pounds per square inch inside the chamber. An electromagnetic field may be generated in the chamber with the gas for up to about 30 minutes. The electromagnetic field may have a first frequency and a second frequency. The electromagnetic field may heat a first portion of the metal in the positioned part to a temperature from about 60 percent to about 99 percent of a melting point of the metal such that the first portion of the metal may have a desired hardness while reducing changes to mechanical properties of the positioned part below the selected depth in a second portion of the metal. The first portion of the metal may extend from a surface of the positioned part to a selected depth from the surface. The selected depth may be about 0.005 inches or greater. The first portion may be a case for the positioned part.

In yet another advantageous embodiment, an apparatus may comprise a chamber, a gas delivery system, and an induction coil system. The chamber may be configured to hold a part as a positioned part. The part may be comprised of a metal. The gas delivery system may be configured to send a gas containing nitrogen into the chamber. The induction coil system may be configured to generate an electromagnetic field inside the chamber. The electromagnetic field may heat a portion of the metal in the positioned part in the chamber to a temperature from about 60 percent to about 99 percent of a melting point of the metal. The portion of the metal may extend from a surface of the positioned part to a selected depth from the surface.

In still yet another advantageous embodiment, a heat system may comprise a chamber, a gas delivery system, an induction coil system, a power unit, and a controller. The chamber may be configured to hold a part as a positioned part. The part may be comprised of a metal selected from a group comprising titanium and a titanium alloy. The part may be selected from a group comprising a gear, a bearing, a crankshaft, a camshaft, a cam follower, a valve, an extruder screw, a die, a bushing, a pin, and an injector. The gas delivery system may be configured to send a gas containing nitrogen into the chamber.

The gas containing the nitrogen in the chamber may have a pressure of up to about 150 pounds per square inch inside the chamber. The induction coil system may be configured to generate an electromagnetic field inside the chamber. The electromagnetic field may have a first frequency and a second frequency. The electromagnetic field may heat a first portion of the metal in the positioned part in the chamber to a temperature from about 60 percent to about 99 percent of a melting point of the metal such that the first portion of the metal may have a desired hardness while reducing undesired changes to mechanical properties of the positioned part below the selected depth in a second portion of the metal. The first portion of the metal may extend from a surface of the positioned part to a selected depth from the surface. The first portion may be a case for the positioned part. The selected depth may be about 0.005 inches or greater. The power unit may be configured to generate a current that causes the induction coil system to generate the electromagnetic field inside the chamber. The controller may be configured to cause the induction coil system to heat the positioned part in the chamber with the gas for up to about 30 minutes.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
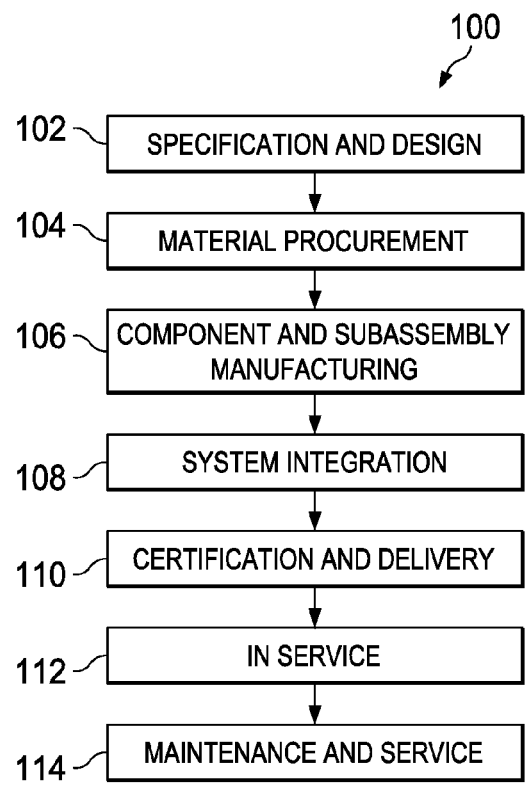
FIG. 1 is an illustration of an aircraft manufacturing and service method in accordance with an advantageous embodiment.
Figure 2:
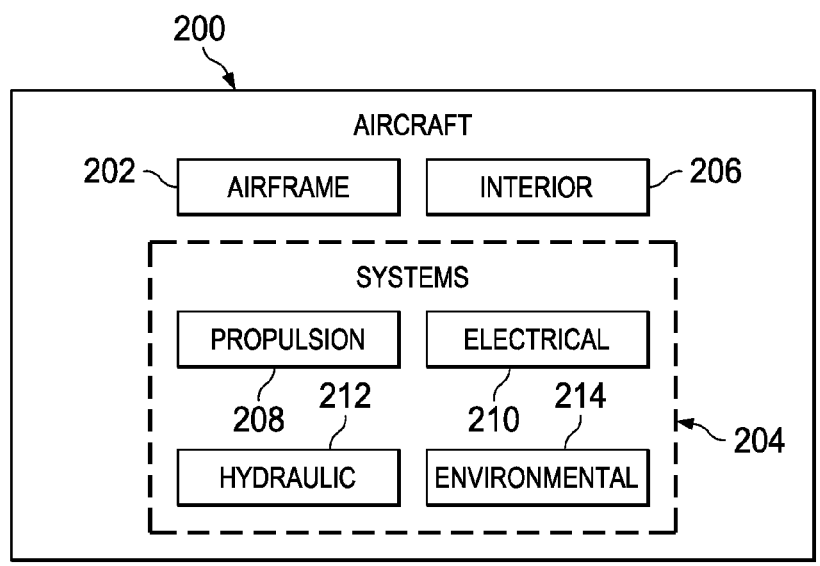
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, without limitation, the different advantageous embodiments recognize and take into account that using titanium as a material for a part, such as a gear or bearing, may provide a good lightweight and high-strength part. In other words, the weight and strength of the part may be at a desired level for a particular use. A lighter weight, as compared to other current materials, may be desirable, especially in aircraft.

The different advantageous embodiments also recognize and take into account that titanium may be softer than other metals, such as steel. As a result, two titanium parts may adhere to each other during use. In other words, the two parts may not slide with respect to each other as smoothly as desired. This situation may occur when the coefficient of friction may become large enough such that surfaces between the two parts may require more force to slide with respect to each other. As a result, the friction between the two surfaces of the parts may be large enough to require greater forces than desired to cause the surfaces to slide with respect to each other.

The different advantageous embodiments recognize and take into account that one solution may involve forming a hardened case on the titanium parts. The case may be formed having a hardness that reduces the friction that the titanium part encounters when turning against another part. The different advantageous embodiments recognize and take into account that this case may be formed on the surface of the gear. The case may extend from the surface down to some selected depth. The depth below the surface may vary.

The different advantageous embodiments recognize and take into account that it may be desirable to have a thicker case than currently available. Currently available processes may provide a case on a titanium part that may be about 0.005 inches or less. The creation of this case may be through a nitriding process used on the titanium. The nitriding process may introduce nitrogen into the surface of the metal to create a hardened surface. By introducing nitrogen into the metal, a layer or section of a harder alloy may be formed.

The different advantageous embodiments recognize and take into account that cases of this thickness may not be suitable for some types of parts. For example, without limitation, with gears and bearings, use may occur in which loads may create stresses in the gear. These stresses may cause undesired features to occur to the case. For example, without limitation, the loads may have undesired effects on the case. These types of features may reduce the life of a gear. As a result, the different advantageous embodiments recognize and take into account that the object, such as an aircraft in which a gear is used, may require more maintenance than desired and may encounter increased costs.

The different advantageous embodiments recognize and take into account that currently used processes for nitriding titanium may take more time than desired. For example, without limitation, one process may involve plasma carburizing to form a case for a part. Plasma carburizing may use a plasma furnace at a temperature of about 700 degrees centigrade to about 1100 degrees centigrade for about three hours. This type of process may result in a case having a depth of about 0.00275 inches.

Currently available processes for forming cases for parts may not be able to provide the desired depths for the cases. For example, without limitation, currently available processes for nitriding may be unable to form a case that has a depth of about 0.005 inches or greater.

Further, the different advantageous embodiments recognize and take into account that currently available processes for nitriding titanium parts that use furnaces may expose substantially the entire titanium part to the nitriding temperatures. As a result, undesired changes to the mechanical properties of the part below the case formed by nitriding may occur. For example, without limitation, the part may have a strength lower than desired below the case. Further, the size of the grains in the part below the case may increase undesirably.

The different advantageous embodiments recognize and take into account that nitriding titanium parts, by exposing only a portion of the part to the nitriding temperatures as compared to the entire part, may reduce and/or prevent undesired changes in the part. For example, without limitation, exposing the surface of the part to the nitriding temperatures as compared to the entire part may reduce undesired decreases in the strength of the part below the case.

Thus, the different advantageous embodiments provide a method and apparatus for manufacturing a part. A part may be positioned in a chamber in which the part may be comprised of metal. A gas containing nitrogen may be sent into the chamber. An electromagnetic field may be generated in the chamber with the gas. The electromagnetic field may heat a portion of the metal in the positioned part in which the portion may extend from a surface of the part to a selected depth from the surface. The electromagnetic field may heat the portion to a temperature from about 60 percent to about 99 percent of the melting point of the metal such that the portion may have a desired hardness, while reducing undesired changes to mechanical properties of the part below the selected depth.

Figure 3:
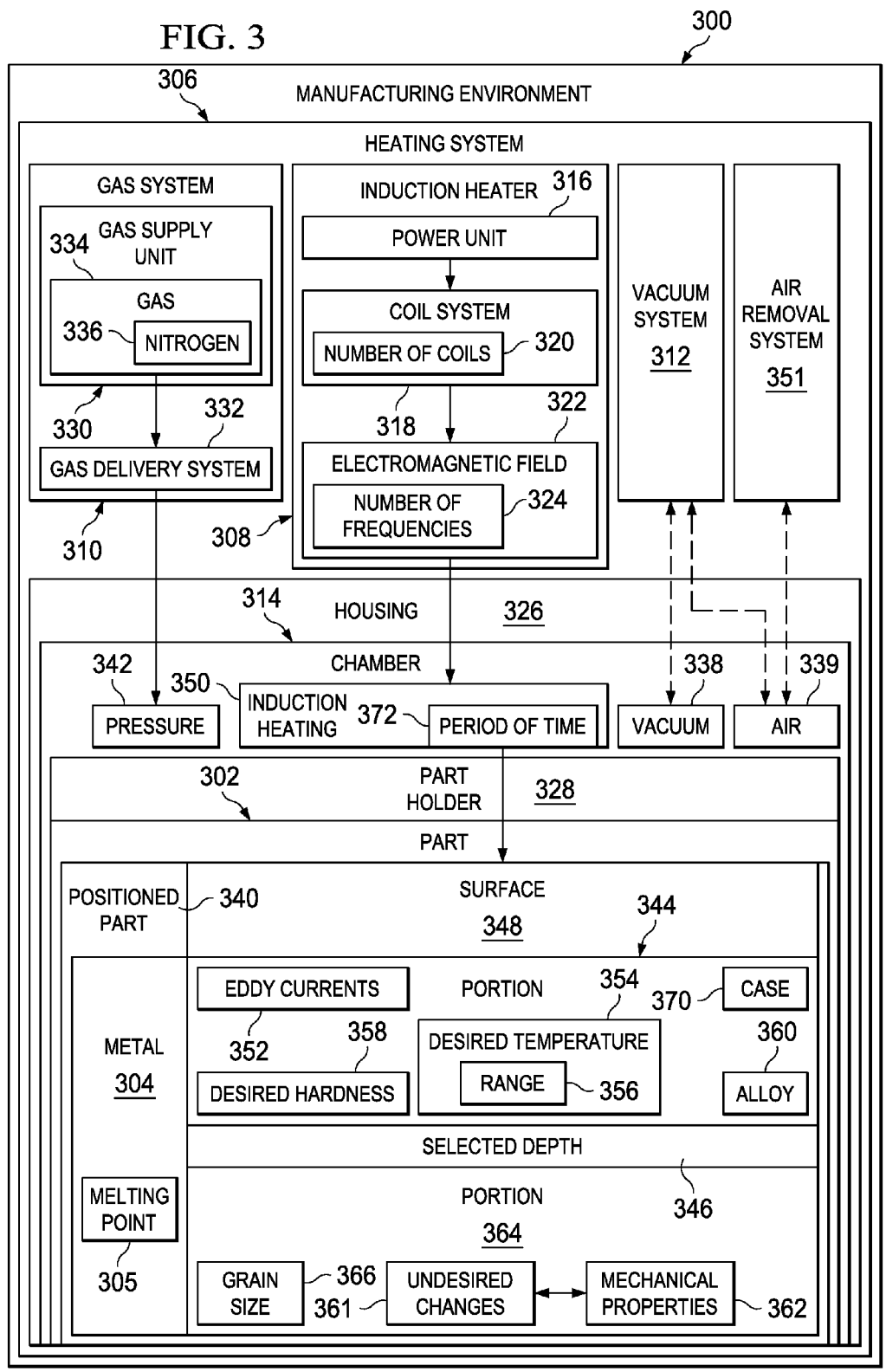
FIG. 3 is an illustration of a block diagram of a manufacturing environment in accordance with an advantageous embodiment.

With reference now to FIG. 3, an illustration of a block diagram of a manufacturing environment is depicted in accordance with an advantageous embodiment. Manufacturing environment 300 may be used to manufacture parts of an aircraft, such as, for example, without limitation, aircraft 200 in FIG. 2.

In this illustrative example, manufacturing environment 300 may be used to process part 302. Part 302 may be comprised of metal 304. In these illustrative examples, part 302 may take a number of different forms. For example, without limitation, part 302 may be a part selected from a group comprising a gear, a bearing, a crankshaft, a camshaft, a cam follower, a valve, an extruder screw, a die, a bushing, a pin, an injector, and/or other suitable types of parts. Metal 304 also may take a number of different forms. For example, without limitation, metal 304 may be selected from a group comprising titanium, a titanium alloy, and/or other suitable types of metals.

In these illustrative examples, part 302 may be processed using heating system 306. Heating system 306 may comprise induction heater 308, gas system 310, vacuum system 312, chamber 314, and/or other suitable components. In this illustrative example, induction heater 308 may include power unit 316 and coil system 318. Coil system 318 may include number of coils 320.

In these illustrative examples, power unit 316 may cause coil system 318 to generate electromagnetic field 322. Electromagnetic field 322 may have number of frequencies 324. In the illustrative examples, number of frequencies 324 may be one frequency, two frequencies, or some other number of frequencies. Number of frequencies 324 may have different values. For example, without limitation, when metal 304 is titanium, number of frequencies 324 may be from about eight kilohertz to about 450 kilohertz. In this illustrative example, number of frequencies 324 may be two frequencies to provide dual frequency induction heating by induction heater 308.

As depicted, chamber 314 may include housing 326 and part holder 328. Part holder 328 may be located inside of housing 326 and may be configured to hold part 302 inside of housing 326.

Gas system 310 may include gas supply unit 330 and gas delivery system 332. Gas delivery system 332 may deliver gas 334 containing nitrogen 336 from gas supply unit 330 to chamber 314. Gas 334 containing nitrogen 336 may be delivered into chamber 314 after vacuum system 312 creates vacuum 338 inside of chamber 314. In this illustrative example, vacuum system 312 may create vacuum 338 to remove substantially all of air 339 in chamber 314. Air 339 comprises oxygen in these illustrative examples.

In these illustrative examples, part 302 may be positioned within chamber 314 as positioned part 340. Part 302 may be positioned using part holder 328.

With positioned part 340 within chamber 314, gas system 310 may send gas 334 containing nitrogen 336 into chamber 314 such that pressure 342 may be generated within chamber 314. Pressure 342 may be, for example, without limitation, up to about 150 pounds per square inch or about 10 bar inside chamber 314. In other illustrative examples, higher pressures may be used.

With gas 334 containing nitrogen 336 and having pressure 342 inside of chamber 314, electromagnetic field 322 may be generated such that electromagnetic field 322 may heat portion 344 of part 302. Portion 344 may extend from surface 348 of positioned part 340 to selected depth 346 from surface 348. In other words, selected depth 346 may be some depth below surface 348. Selected depth 346, in these illustrative examples, may be about 0.005 inches or greater.

Selected depth 346 may be selected through the generation of electromagnetic field 322. Various parameters, such as frequency, number of frequencies, time, and/or other suitable parameters, may be selected to cause heating within portion 344 to selected depth 346 in positioned part 340.

For example, without limitation, number of frequencies 324 may be selected to heat portion 344 to selected depth 346. In these illustrative examples, this type of heating of positioned part 340 may be induction heating 350. Induction heating 350 may be a process of heating portion 344 in which eddy currents 352 may be generated within portion 344. Resistance of metal 304 within portion 344 may lead to heating of metal 304 within portion 344.

Further, number of frequencies 324 may be selected such that induction heating 350 occurs substantially for portion 344 of metal 304 but not substantially for portions of metal 304 below portion 344. Other portions of metal 304 below portion 344 may be heated through conduction. This type of heating may not occur for a period of time long enough to cause undesired changes in the portions of metal 304 below portion 344.

In these illustrative examples, the heating of portion 344 in positioned part 340 may be such that desired temperature 354 is reached within portion 344. Desired temperature 354 may have range 356. In these examples, desired temperature 354 may be maintained at a particular temperature within range 356 or varied during heating of portion 344 in positioned part 340.

Range 356, in these examples, may be, for example, without limitation, from about 60 percent to about 99 percent of melting point 305 of metal 304. As one illustrative example, when metal 304 is titanium, range 356 may be from about 1,000 degrees Celsius to about 1,600 degrees Celsius.

In these illustrative examples, the heating may be such that portion 344 has desired hardness 358. Portion 344 may have nitrogen 336 from gas 334 in portion 344. The presence of nitrogen 336 within portion 344 may generate alloy 360. In these illustrative examples, portion 344 may form case 370 in positioned part 340. Number of frequencies 324 may be selected to provide selected depth 346 for case 370.

The heating of portion 344 to create desired hardness 358 may be performed while reducing undesired changes 361 to mechanical properties 362 of positioned part 340 below selected depth 346. As one illustrative example, undesired changes 361 to portion 364 below or further in from surface 348 below selected depth 346 may include an undesired increase in grain size 366 in portion 364. Increasing grain size 366 may result in a decrease in time before undesired effects occur within portion 364.

In these illustrative examples, heating of positioned part 340 may occur for period of time 372. For example, without limitation, period of time 372 may be from about one minute to about 30 minutes or more. In other illustrative examples, period of time 372 may be, for example, without limitation, about an hour.

Additionally, period of time 372 may be a continuous or discontinuous period of time. For example, without limitation, in one illustrative example, positioned part 340 may be heated continuously for about 30 minutes. In another illustrative example, positioned part 340 may be heated six different times for about 5 minutes each time to heat positioned part 340 for about 30 minutes.

The illustration of manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, vacuum system 318 may not be present in heating system 306. In other words, vacuum system 318 may not be used to create vacuum 338 for chamber 314. In these advantageous embodiments, chamber 314 may be an air-tight chamber. Further, air removal system 351 may be used in the place of vacuum system 318 to remove substantially all of air 339 in chamber 314.

Further, in some advantageous embodiments, part 302 may be manufactured for use with other objects, other than aircraft 200 in FIG. 2. For example, part 302 may be used in a spacecraft, a satellite, a submarine, a surface ship, an automobile, a tank, a truck, a power plant, an elevator system, and/or other suitable types of objects.

Figure 4:
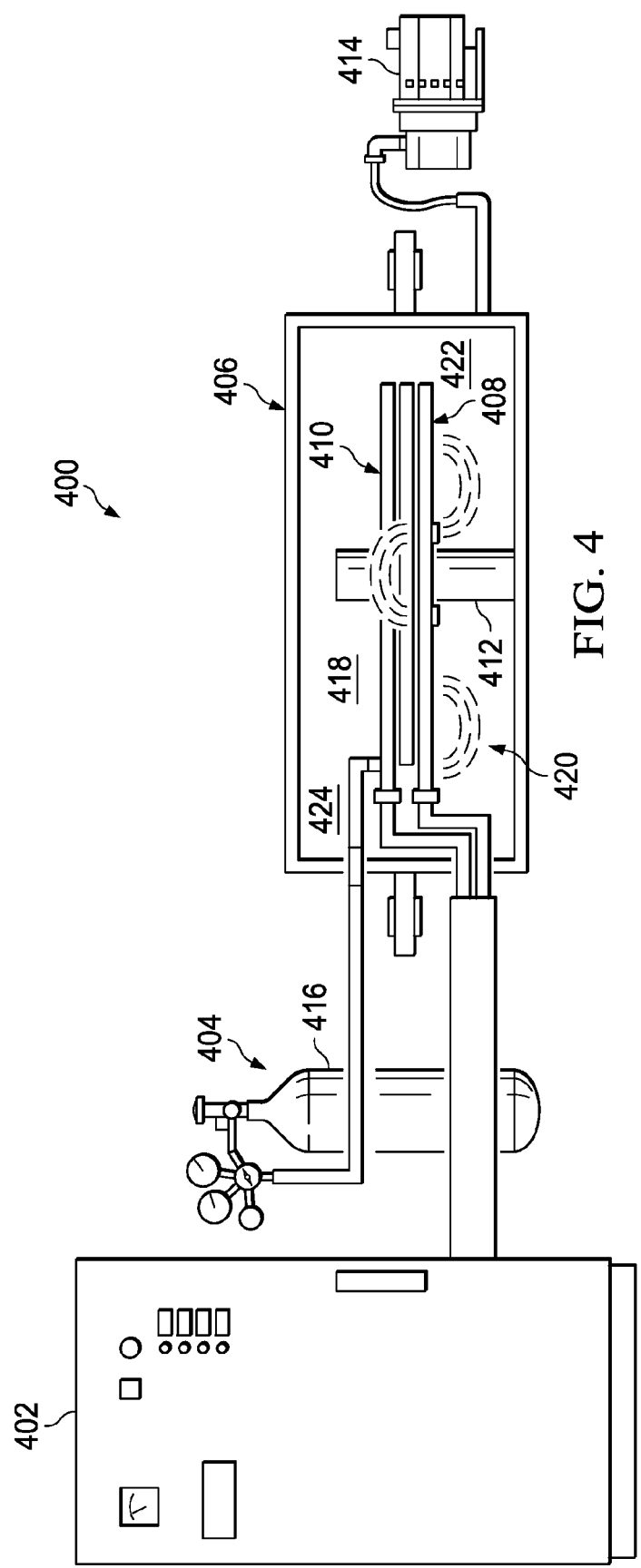
FIG. 4 is an illustration of a heating system in accordance with an advantageous embodiment.

With reference now to FIG. 4, an illustration of a heating system is depicted in accordance with an advantageous embodiment. In this illustrative example, heating system 400 may be an example of one implementation for heating system 306 in FIG. 3.

In this illustrative example, heating system 400 may include power supply 402, inert gas supply 404, chamber 406, induction coil 408, cooling ring manifold 410, part holder 412, and vacuum pump 414. Inert gas supply 404 may be connected to cooling ring manifold 410, which may be nested within induction coil 408. Induction coil 408 may be connected to power supply 402.

Inert gas supply 404 may supply inert gas 416 into interior 418 of chamber 406, while induction coil 408 may generate electromagnetic field 420. Vacuum pump 414 may create vacuum 422 within chamber 406. Further, gas supply 404 may introduce gas 416 into interior 418 of chamber 406 with pressure 424.

Figure 5:
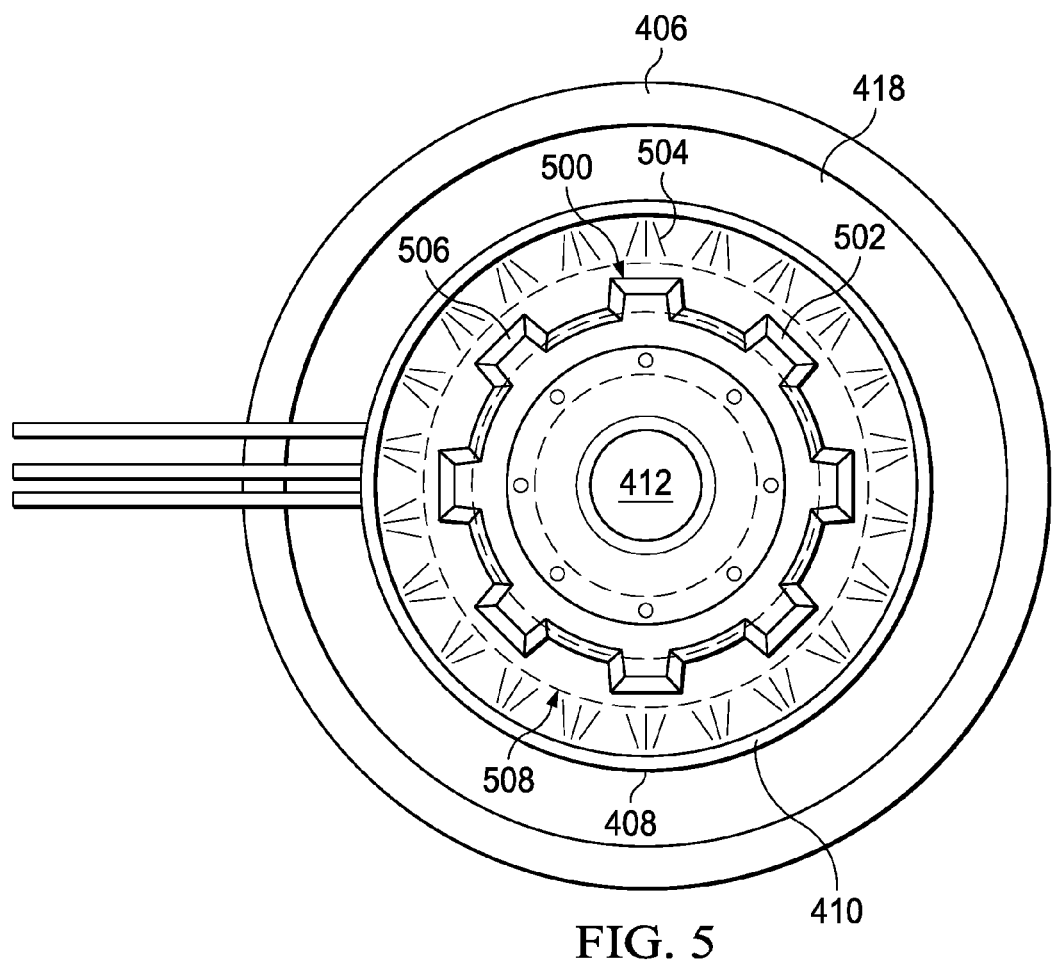
FIG. 5 is an illustration of a cross-sectional top view of a chamber in a heating system in accordance with an advantageous embodiment.

With reference now to FIG. 5, an illustration of a cross-sectional top view of a chamber in a heating system is depicted in accordance with an advantageous embodiment. As depicted, part 500 may be an example of positioned part 340 in FIG. 3. As depicted, part 500 may take the form of gear 502 and may be positioned within interior 418 of chamber 406 on part holder 412. Gas 504 may be within interior 418 of chamber 406, while electromagnetic field 508 may be generated to heat gear 502. Surface 506 may include tooth surfaces of gear 502.

Figure 6:
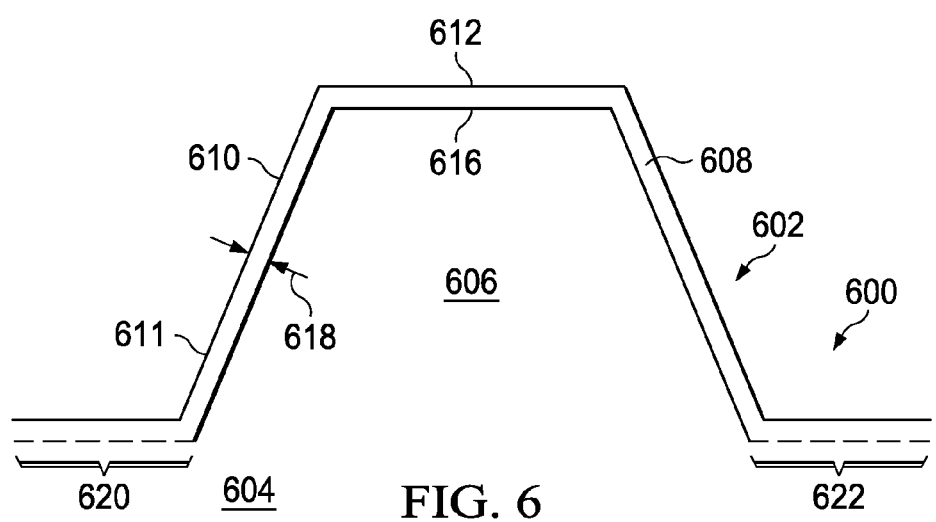
FIG. 6 is an illustration of a cross-sectional view of a portion of a gear in accordance with an advantageous embodiment.

With reference now to FIG. 6, an illustration of a cross-sectional view of a portion of a gear is depicted in accordance with an advantageous embodiment. In this illustrative example, gear 600 may be an example of positioned part 340 after being heated using heating system 306 in FIG. 3.

In this illustrative example, gear 600 may have tooth 602 on wheel 604. Gear 600 may have portion 606 and portion 608. Portion 608 may take the form of case 610. Portion 608 may be an interior portion of gear 600.

In these illustrative examples, case 610 may extend from surface 612 of gear 600 to depth 616. Depth 616 may be thickness 618 for case 610. In these illustrative examples, case 610 may have thickness 618 equal to about 0.005 inches or greater.

Case 610 may take the form of hardened case 611 in this illustrative example. Hardened case 611 may be formed from portion 608 of gear 600 through the use of heating system 306 in FIG. 3. Hardened case 611 may provide increased wear resistance for gear 600 and may allow gear 600 to carry increased loads.

As depicted in this example, gear 600 may be inductively heated such that case 610 is formed for tooth 602 and for portion 620 and portion 622 of wheel 604. However, in other illustrative examples, tooth 602 may be inductively heated using heating system 306 in FIG. 3 such that case 610 is not formed on portion 620 and portion 622 of wheel 604. In other words, heating system 306 in FIG. 3 may be used to inductively heat gear 600 such that only portions of surface 612 are heated to depth 616.

Figures 7, 8:
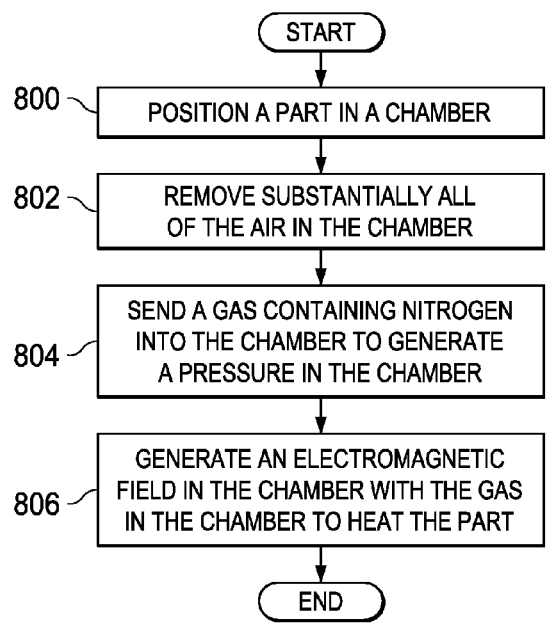
FIG. 7 is an illustration of a table of test results from heating a part in accordance with an advantageous embodiment.
FIG. 8 is an illustration of a flowchart of a process for manufacturing a part in accordance with an advantageous embodiment.

With reference now to FIG. 7, an illustration of a table of test results from heating a part is depicted in accordance with an advantageous embodiment. In this illustrative example, table 700 may include test results 701 from heating a part using heating system 306 in FIG. 3.

As depicted, table 700 may include test results 701 for test 1 702, test 2 704, test 3 706, and test 4 708. The conditions for testing may include temperature 710 at time 712.

The results of testing may include surface hardness 714 and effective case depth 716. Surface hardness 714 may be measured using Rockwell Superficial Hardness Testing, such as H15N, as specified by the American Society for Testing and Materials (ASTM) E18. Further, surface hardness 714 may be approximately converted to the Rockwell C scale HRC in hardness 718. Additionally, effective case depth 716 may be measured for a specific hardness using a Vickers Hardness Tester, as specified by the American Society for Testing and Materials E 384.

With reference now to FIG. 8, an illustration of a flowchart of a process for manufacturing a part is depicted in accordance with an advantageous embodiment. The process illustrated in FIG. 8 may be implemented using heating system 306 to manufacture part 302 in FIG. 3.

The process may begin by positioning part 302 in chamber 314 (operation 800). Part 302 may be positioned part 340 after being positioned within chamber 314. Part 302 may be positioned by part holder 328 in chamber 314. In this illustrative example, part 302 may be comprised of metal 304.

Thereafter, the process may remove substantially all of air 339 in chamber 314 (operation 802). Operation 802 may be performed by applying vacuum 338 in chamber 314 using vacuum system 312, or by using air removal system 351. In these examples, air 339 comprises oxygen.

The process may then send gas 334 containing nitrogen 336 into chamber 314 to generate pressure 342 in chamber 314 (operation 804). In operation 804, gas 334 may be sent to chamber 314 by gas system 310. In this illustrative example, pressure 342 may be up to about 150 pounds per square inch or about 10 bar inside chamber 314.

Then, the process may generate electromagnetic field 322 in chamber 314 with gas 334 in chamber 314 to heat part 302 (operation 806), with the process terminating thereafter. Operation 806 may be performed for up to about 30 minutes in this illustrative example. Electromagnetic field 322 may heat portion 344 of metal 304 to desired temperature 354. Portion 344 may extend from surface 348 to selected depth 346. Further, desired temperature 354 may be about 60 percent to about 99 percent of melting point of metal 304 in this illustrative example.

Additionally, electromagnetic field 322 may heat portion 344 such that portion 344 may have desired hardness 358 while reducing undesired changes 361 to mechanical properties 362 of portion 364 below selected depth 346. For example, without limitation, increases in grain size 366 in portion 364 may be reduced.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for manufacturing a part. A part may be positioned in a chamber in which the part may be comprised of metal and may be a positioned part after being positioned. A gas containing nitrogen may be sent into the chamber. An electromagnetic field may be generated in the chamber with the gas. The electromagnetic field may heat a portion of the metal in the positioned part in which the portion may extend from a surface of the part to a selected depth from the surface. The electromagnetic field may heat the portion to a temperature from about 60 percent to about 99 percent of the melting temperature of the metal such that the portion may have a desired hardness, while reducing changes to mechanical properties of the part below the selected depth.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a part, the method comprising:
   positioning the part in a chamber in which the part is comprised of a metal;

sending a gas containing nitrogen into the chamber using a gas delivery system;

generating, using an induction coil system comprising a number of induction coils, a dual frequency electromagnetic field in the chamber with the gas in which the dual frequency electromagnetic field selectively heats a portion of the metal in the positioned part, in which the portion of the metal extends from a surface of the positioned part to a depth from the surface, to a temperature from about 60 percent to about 99 percent of a melting point of the metal; and cooling the part using a cooling ring manifold connected to the gas delivery system, the cooling ring manifold nested within the number of induction coils.

2. The method of claim 1, wherein the portion of the metal has a hardness while reducing changes to mechanical properties of the positioned part below the depth.

3. The method of claim 2, wherein the step of generating the electromagnetic field in the chamber with the gas in which the electromagnetic field heats the portion of the metal in the positioned part, in which the portion of the metal extends from the surface of the positioned part to the depth from the surface, to the temperature from about 60 percent to about 99 percent of the melting point of the metal such that the portion of the metal has the hardness while reducing the changes to the mechanical properties of the positioned part below the depth comprises:

generating the electromagnetic field in the chamber with the gas in which the electromagnetic field has a first frequency and a second frequency and in which the electromagnetic field heats the portion of the metal in the positioned part, in which the portion of the metal extends from the surface of the positioned part to the depth from the surface, to the temperature from about 60 percent to about 99 percent of the melting point of the metal such that the portion of the metal has the hardness while reducing the changes to the mechanical properties of the positioned part below the depth.

4. The method of claim 2, wherein the step of generating the electromagnetic field in the chamber with the gas in which the electromagnetic field heats the portion of the metal in the positioned part, in which the portion of the metal extends from the surface of the positioned part to the depth from the surface, to the temperature from about 60 percent to about 99 percent of the melting point of the metal such that the portion of the metal has the hardness while reducing the changes to the mechanical properties of the positioned part below the depth comprises:

generating the electromagnetic field in the chamber with the gas for up to about 30 minutes in which the electromagnetic field heats the portion of the metal in the positioned part and in which the portion of the metal extends from the surface of the positioned part to the depth from the surface, to the temperature from about 60 percent to about 99 percent of the melting point of the metal such that the portion of the metal has the hardness while reducing the changes to the mechanical properties of the positioned part below the depth.

5. The method of claim 1, wherein the step of sending the gas containing the nitrogen into the chamber comprises:

sending the gas containing the nitrogen into the chamber to generate a pressure of up to about 150 pounds per square inch inside the chamber.

6. The method of claim 1 further comprising:

removing substantially all air from the chamber prior to sending the gas containing the nitrogen into the chamber.

7. The method of claim 6, wherein the step of removing substantially all of the air from the chamber prior to sending the gas containing the nitrogen into the chamber comprises:

removing substantially all the air from the chamber using at least one of a vacuum system and an air removal system.

8. The method of claim 1, wherein the portion of the metal is a first portion and wherein the first portion is a case for the positioned part.

9. The method of claim 1, wherein the chamber comprises a vacuum chamber.

10. The method of claim 1, wherein the depth is about 0.005 inches or greater.

11. The method of claim 1, wherein the metal is selected from the group consisting of titanium and a titanium alloy.

12. The method of claim 1, wherein the part is selected from the group consisting of a gear, a bearing, a crankshaft, a camshaft, a cam follower, a valve, an extruder screw, a die, a bushing, a pin, and an injector.

13. A method for forming a case on a titanium part, the method comprising:

positioning the titanium part in a chamber in which the titanium part is comprised of a metal and is a positioned part, in which the metal is selected from the group consisting of titanium and a titanium alloy and in which the titanium part is selected from the group consisting of a gear, a bearing, a crankshaft, a camshaft, a cam follower, a valve, an extruder screw, a die, a bushing, a pin, and an injector;

after removing all air from the chamber, sending a gas containing nitrogen into the vacuum chamber, using a gas delivery system, after applying the vacuum in the vacuum chamber to generate a pressure of up to about 150 pounds per square inch inside the vacuum chamber;

generating a dual frequency electromagnetic field in the chamber with the gas, using an induction coil system comprising a number of induction coils, for up to about 30 minutes in which the dual frequency electromagnetic field has a first frequency and a second frequency, in which the dual frequency electromagnetic field selectively heats a first portion of the metal in the positioned part to a temperature from about 60 percent to about 99 percent of a melting point of the metal such that the first portion of the metal has a hardness while reducing changes to mechanical properties of the positioned part below a depth in a second portion of the metal in which the first portion of the metal extends from a surface of the positioned part to the depth from the surface, the depth is about 0.005 inches or greater, and the first portion is the case for the positioned part; and cooling the part using a cooling ring manifold connected to the gas delivery system, the cooling ring manifold nested within the number of induction coils.

* * * * *